(No Model.)

G. N. OSGOOD.
COTTON GIN.

No. 284,223. Patented Sept. 4, 1883.

Witnesses
S. N. Piper.
E. B. Spratt.

Inventor.
Galen Norton Osgood.
by R. H. Eddy att'y.

UNITED STATES PATENT OFFICE.

GALEN NORTON OSGOOD, OF BOSTON, MASSACHUSETTS.

COTTON-GIN.

SPECIFICATION forming part of Letters Patent No. 284,223, dated September 4, 1883.

Application filed March 12, 1883. (No model.)

*To all whom it may concern:*

Be it known that I, GALEN NORTON OSGOOD, of Boston, in the county of Suffolk, of the Commonwealth of Massachusetts, have invented a new and useful Improvement in Cotton-Gins; and I do hereby declare the same to be described in the following specification, and represented in the accompanying drawings, of which—

Figure 1:
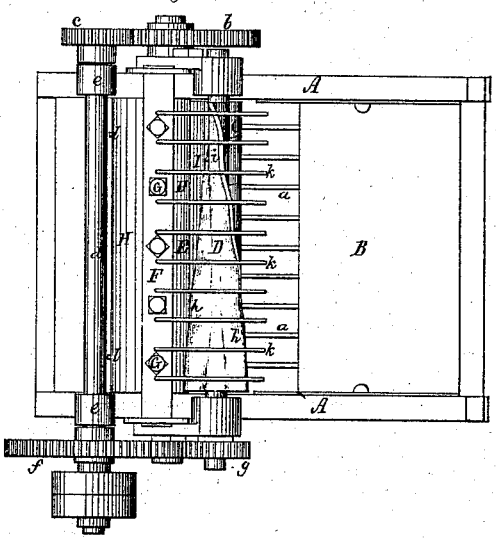
Figure 6:
Figure 4:
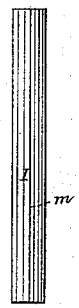
Figure 7:
Figure 5:
Figure 2:
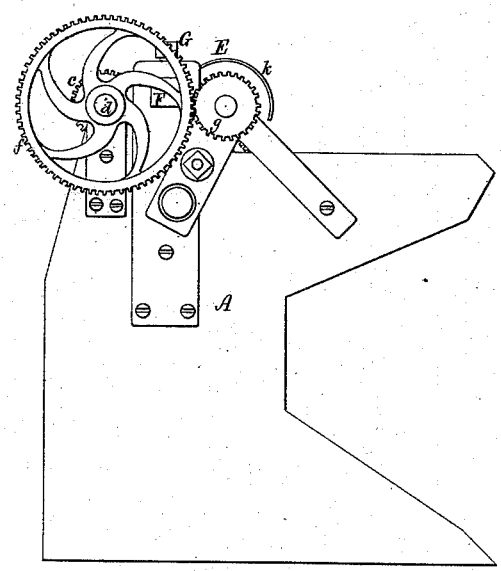

Figure 1 is a top view, Fig. 2 a side elevation, and Fig. 3 a longitudinal section, of a gin provided with my invention, the nature of which I have defined or attempted to define in the claims hereinafter presented. Fig. 4 is a top view, and Fig. 5 an end view, of the concave plate or seed-arrester, to be explained. Fig. 6 is a top view, and Fig. 7 an end view, of the plate-spring or elastic supporter of the seed-arrester.

In such drawings, A denotes the frame for supporting the main operative parts of the gin, there being within such frame an inclined chute, B, having a series of teeth, $a$, projecting from it at its inner edge, and terminating near to the periphery of a leather-covered cylinder, C. This cylinder, arranged within the frame in manner as represented, has its journals supported in suitable bearings, and fixed to one of them is a gear, $b$, that engages with a pinion, $c$, carried by a driving-shaft, $d$. The shaft $d$, supported in suitable boxes, $e\ e$, is provided with another gear, $f$, that engages with a pinion, $g$, fixed on the shaft or one of the journals of a rotary beater, D, which is arranged in rear of the cylinder and above its axis, such being as represented. This beater has one or more spiral wings, $h$, each of the said wings being not only arranged spirally on the shaft $i$, but having a corrugated or serpentine or waved shaped outer edge, as represented, which is to be part of the circumference of a cylinder whose radius is equal to the distance of the said edge from the axis of the beater-shaft. This beater is to run close to the seed-arrester and the periphery of the cylinder C. Extending over the beater, in the manner as represented, is a guard, E, consisting of a series of curved wires or teeth, $k$, projecting from a horizontal bar, F, arranged in the frame in manner as shown. In the said bar is a series of screws, G, each of which screws into and through the bar and against a plate-spring or elastic plate, H, which at its front edge rests on the frame A and against studs $l\ l$, extending up therefrom. At its lower edge or part the plate H rests on the concave plate or seed-arrester I, which in turn rests on the upper part of the periphery of the cylinder C. This seed-arrester is constructed with or has a shoulder, $m$, to rest against the rear edge of the elastic plate H.

Figure 3:
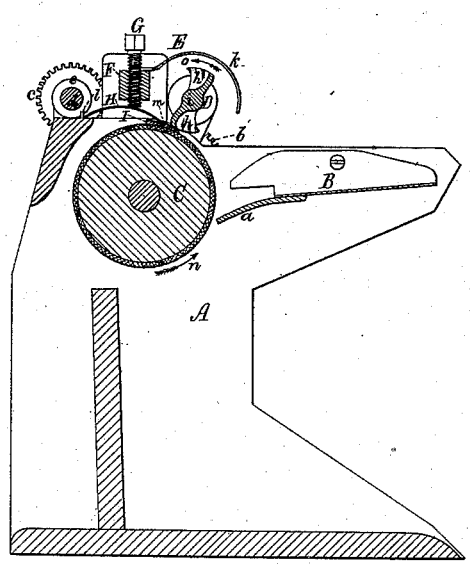

On the chute being supplied with cotton having seeds in it, and the driving-shaft $d$ being put in revolution, so as to cause the cylinder C and the rotary beater D to be revolved in directions as indicated by the arrows $n$ and $o$, marked on them in Fig. 3, the cotton will be drawn upward between the cylinder and seed-arrester, and by such will be stripped from the seeds, while they will be stopped by the seed-arrester. The beater, revolving in the meantime, will aid in separating the seeds from the cotton, and will drive them downward, so as to cause them to be discharged between the teeth of the chute. As the cotton passes between the cylinder and the seed-arrester the latter will give way and allow it to be advanced by the cylinder, from which it may be removed by a doffer or other suitable device. The seed-arrester, by means of its elastic supporting-plate, will be pressed down upon the cotton, and not only will be prevented from moving forward with the cylinder, but enabled to accommodate itself to the mass of cotton passing between it and the cylinder. Any tendency of the cotton to pass upward over and upon the upper surface of the seed-arrester will be checked by the beater while revolving, which not only serves to prevent such passage of the cotton, but to aid in separating it from the seeds and to discharge them, as hereinbefore mentioned.

A beater made with one or more straight wings will not operate to the advantage that one will having a spiral wing or wings, and especially when each spiral wing of it is waved or serpentine transversely at its edge, as represented, and such edge constitutes part of the periphery of a cylinder, as explained, and therefore the spiral-wing beater, or one having each wing spiral and corrugated, as represented, constitutes, in connection with the rotary cylinder and the seed-arrester and its elastic support-plate, important features of my invention.

By means of the series of screws G in the bar F the pressure of the elastic plate on the seed-arrester may be increased or diminished, as circumstances may require.

The guard E serves to intercept any cotton that may be thrown upward by the beater, and to cause such cotton to be carried by the beater over and down upon the said arrester and into or upon the mass that may be in the act of being drawn forward between the cylinder and the seed-arrester.

In practice a gin constructed as hereinbefore described has been found to operate very successfully.

I claim—

1. The elastic or spring plate, the bar and its series of screws over such plate, arranged, as represented, in the frame, in combination with the rotary cylinder and beater, and with the curved plate or seed-arrester extending under and provided with the bearing-shoulder to rest against such spring-plate, all being to operate essentially as explained.

2. The combination of the toothed chute, rotary cylinder, rotary and spiral-winged beater, toothed guard, seed-arrester, and the spring-plate, with its series of supporting-screws and the bar, all arranged and adapted and having mechanism for operating the said beater and cylinder, substantially as set forth.

3. The combination of the rotary cylinder, rotary and spiral winged beater, toothed guard, seed-arrester, the spring-plate, the series of supporting-screws and the bar, all arranged and adapted and having mechanism for operating the said beater and cylinder, substantially as represented.

4. The combination of the rotary cylinder, the spiral and corrugated winged rotary beater, the toothed guard, seed-arrester, and the spring-plate, with the series of supporting-screws and their bar, all arranged and adapted and having mechanism for operating said beater and cylinder, substantially as represented.

GALEN NORTON OSGOOD.

Witnesses:
R. H. EDDY,
E. B. PRATT.